(12) United States Patent
Enders et al.

(10) Patent No.: US 6,805,375 B2
(45) Date of Patent: Oct. 19, 2004

(54) DEVICE FOR WIRELESS TRANSMISSION OF A TRIGGER SIGNAL

(75) Inventors: Thorsten Enders, Vaihingen (DE); Peter Bolz, Markgroeningen (DE); Harald Kazmierczak, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/956,054

(22) Filed: Sep. 20, 2001

(65) Prior Publication Data

US 2002/0167399 A1 Nov. 14, 2002

(30) Foreign Application Priority Data

Sep. 21, 2000 (DE) .......................................... 100 46 695

(51) Int. Cl.[7] .............................................. B60R 21/32
(52) U.S. Cl. ...................... 280/735; 180/274; 180/282; 307/10.2
(58) Field of Search ................................ 280/734, 735; 307/10.2; 340/825.72; 180/274, 282

(56) References Cited

U.S. PATENT DOCUMENTS 4,087,782 A * 5/1978 Oishi et al.
5,636,863 A * 6/1997 Reid et al. .................. 280/735
6,206,416 B1 * 3/2001 Faigle et al. ................ 280/735
6,441,511 B1 * 8/2002 Masudaya .................. 307/10.1
6,565,119 B2 * 5/2003 Fogle, Jr. .................... 280/735

FOREIGN PATENT DOCUMENTS

EP          0 616 924         9/1994

* cited by examiner

Primary Examiner—Eric Culbreth
(74) Attorney, Agent, or Firm—Kenyon & Kenyon

(57) ABSTRACT

A device for wireless transmission of a trigger signal, in particular for a restraint system, which has a redundancy path to ensure reliable triggering of a restraint system, is proposed. On a primary side of a transmitter a redundancy unit is arranged; this generates a redundancy signal from a trigger command, the redundancy signal being detected by an enable unit on the secondary side in order to enable a trigger circuit for the restraint system, the trigger circuit then being triggered by an evaluation unit on the secondary side via a trigger signal. The trigger circuit triggers a restraint system.

13 Claims, 3 Drawing Sheets

DEVICE FOR WIRELESS TRANSMISSION OF A TRIGGER SIGNAL

FIELD OF THE INVENTION

The present invention is based on a device for wireless transmission of a trigger signal, in particular for a restraint system.

BACKGROUND INFORMATION

From European published, unexamined patent application 616 924 A1, a device and a method for wireless transmission and transmission of power are known heretofore. Data transfer from a primary side to the secondary side is carried out during a short interrupt at a primary-side breaker gap during the energy storage phase; data transfer in the reverse direction is carried out via a secondary-side load pulse during the energy storage phase.

SUMMARY

By contrast, the device according to the present invention for wireless transmission of a trigger signal, in particular for a restraint system, has the advantage that the redundancy ensures additional reliability with respect to erroneous triggering. In particular in the case of restraint systems this ensures increased reliability with respect to erroneous triggering of an airbag.

It is particularly advantageous that the enable unit on the secondary side switches the evaluation unit over to a status where it is ready to receive the trigger signal, and preferably an interrupt is used for this. Thus a kind of "preliminary stage" in the trigger signal is achieved via the redundancy signal that activates the enable unit, so that the actual trigger signal is received reliably by the evaluation unit on the secondary side. This ensures increased reliability with respect to receiving of the trigger signal.

Furthermore, it is useful that the redundancy signal is carried out via switching over of the frequency and/or level of the signals to be transmitted via the transmitter. As a result, this redundancy signal can be evaluated in a straightforward manner on the secondary side.

Furthermore, it is useful that in addition to the trigger signal diagnostic signals and control signals, in particular for the restraint system, can be transmitted via the transmitter. This transmission is interrupted for the trigger signal, so that the trigger signal is prioritized over the diagnostic and/or control signals. This also allows better use to be made of this transmission path, and means transmission of the trigger signal is more reliable.

Furthermore, it is useful that the transmitter is either inductive or capacitive, depending on the application. The transmitter may also be optical. In this case, both the data and the power are transmitted optically between the steering wheel and the steering column.

Moreover, it is useful that the trigger circuit triggers at least one ignition circuit having at least one airbag, if necessary a seat-belt tensioning device as well as the ignition circuits and air bags being also triggered by the trigger circuit.

Furthermore, it is useful that the redundancy unit has a trigger command detector, a pulse generator, and/or a level switch-over unit. As a result, if a trigger signal is detected, either a pulse train and/or an increased level is generated as the redundancy signal. Both forms of signal—a pulse train and an increased level—can be detected on the secondary side in a straightforward manner. Furthermore, it is useful that the enable unit has a pulse counter and/or a comparator for the level, and a status circuit for triggering the secondary-side evaluation unit. As a result, the enable unit can evaluate the pulse train and/or the increased level and can activate the trigger circuit using the monoflop. The status circuit is used to activate the secondary-side evaluation unit so that it is ready to receive the trigger signal.

Furthermore, it is useful that the primary side 13 of the device according to the present invention is arranged in a steering column 501 or vehicle floor 502, and the secondary side 7 is arranged in a steering wheel 503 and/or a vehicle seat 504, as shown in FIG. 5. Herein, it is also useful that the components on the primary side 13 are arranged in a housing, e.g., as identified by reference numeral 100 in FIGS. 1 and 4, and if necessary are integrated into a control device for the restraint systems.

DETAILED DESCRIPTION

Restraint systems such as airbags and seat belt tensioning devices are being used increasingly and in ever greater numbers in motor vehicles. In the case of airbags located in steering columns and vehicle seats, the signals must be sent to the trigger circuit of the restraint systems via wireless transmission, so as to avoid the need for plug-and-socket connections, which are prone to errors. To accomplish this, above all an inductive transmitter is suitable. To prevent erroneous functioning in a processor arranged on the secondary side and thus to prevent erroneous triggering, according to the present invention a redundancy path is provided in a device for wireless transmission of a trigger signal, in particular for restraint systems. The trigger signal from the control device is detected on the primary side by a redundancy unit and converted into a redundancy signal. Furthermore, the trigger signal is also detected by a primary-side processor and transmitted via the transmitter. On the secondary side, the redundancy signal is evaluated, and if the redundancy signal is present, the trigger circuit is switched to active status. The secondary-side processor then switches on the trigger circuit when the trigger signal is received, so that the trigger circuit activates a restraint system.

Figure 1:
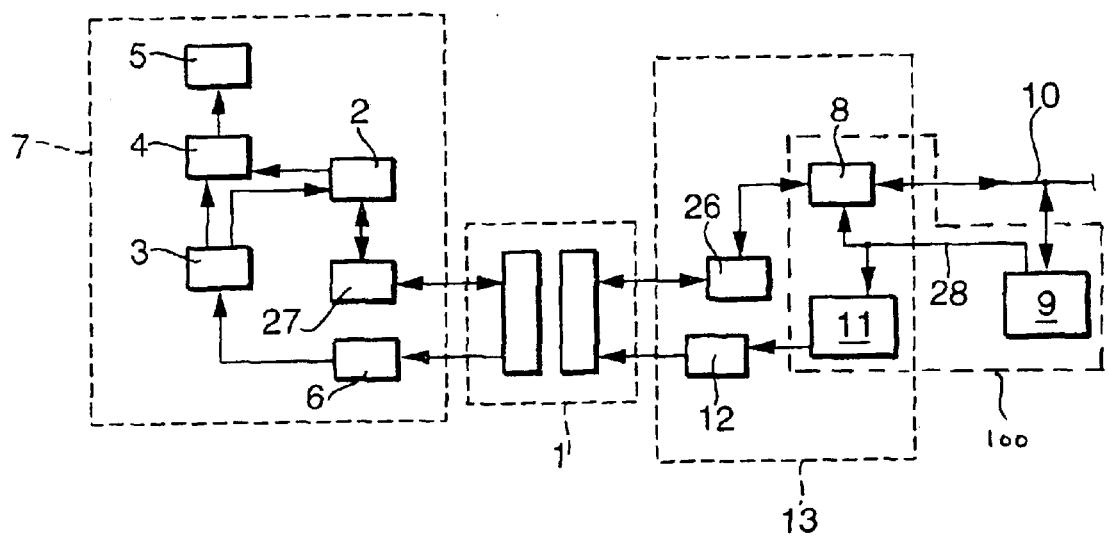
FIG. 1 is a block diagram of the device according to the present invention.

FIG. 1 is a block diagram of the device according to the present invention. Transmitter 1, which in this case is an inductive transmitter, connects primary side 13 to secondary side 7. Secondary side 7 includes evaluation unit 2, enable unit 3, trigger circuit 4, restraint system 5, driver 27 and further driver 6. Driver 27 is used to amplify the information signals, and driver 6 is used for transferring power from primary side 13 to secondary side 7.

Primary side 13 includes processor 8, enable unit 11, driver 26 and driver 12. Driver 26 is used to amplify diagnostic signals, control signals, and trigger signals, and driver 12 is used to transfer power from primary side 13 to secondary side 7 and as a redundancy path. For power transfer, it is to some extent necessary for transmitter 1, which in this case is embodied as an inductive transmitter, to have two windings (coils), one for power transfer and one for information transfer. The two windings are arranged on a shared core. It is also feasible to use two separate transmitters. If two separate transmitters are used, the magnetic fields are not. coupled; by contrast, if two windings are used as described above, the arrangement on the core allows the magnetic fields to be coupled.

Vehicle bus 10, in this case a controller area network (CAN) bus, is connected to first data input/output of processor 8. Furthermore, controller area network bus 10 is connected to a data input/output of control device 9 for the restraint system. Ignition line 28 is connected to a data output of control device 9 and connects to a data input of processor 8 and to a data input of redundancy unit 11. In the present case, redundancy unit 11 is embodied as a programmable component, a straightforward processor, or an application-specific integrated circuit (ASIC).

A second data input/output of processor 8 connects processor 8 to transmitter 1 via driver 26, which functions as a signal amplifier. Driver 12 is connected to a data output of redundancy unit 11. One output of driver 12 connects to transmitter 1.

On the secondary side, driver 27 is connected to a data input/output of transmitter 1. Processor 2 is connected to a data input/output of driver 27. Enable unit 3 is connected to a data input of processor 2. Trigger circuit 4 is connected to a data output of processor 2. Driver 6 is connected to an output of transmitter 1 on the secondary side. Enable unit 3 is connected to an output of driver 6. A second data output of enable unit 3 connects to a second data input of trigger circuit 4, which connects to restraint system 5 via a data output.

If it is sensed that the vehicle has undergone an impact, control device 9 sends a trigger command for restraint system 5 to processor 8 as the evaluation unit, and also to redundancy unit 11, so that a redundancy signal is generated for the trigger command. The trigger command from control device 9 is sent via ignition line 28 to processor 8 and to redundancy unit 11. Alternatively, an application-oriented integrated circuit can be used instead of processor 8 as the evaluation unit. Diagnostic signals and other control signals are sent via controller area network bus 10.

Figure 2:
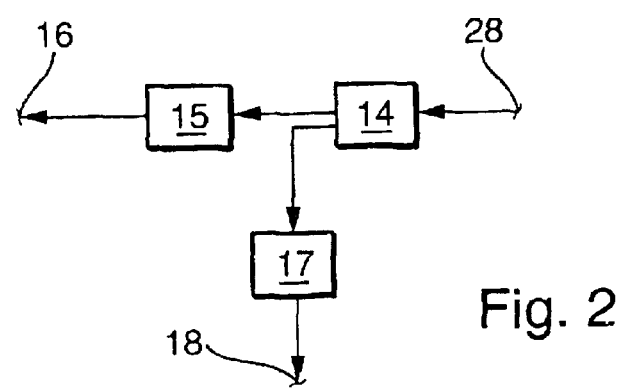
FIG. 2 is a block diagram of the redundancy unit.

Redundancy unit 11 generates one and/or two redundancy signals from the trigger signal. FIG. 2 is a block diagram of redundancy unit 11. Individual function blocks that are programmed into the redundancy unit's chip are shown. Redundancy unit 11 receives the trigger command from control device 9 via ignition line 28. Ignition line 28 connects to trigger command detector 14. Trigger command detector 14 compares the signal that is received with a stored signal, in order to determine whether a trigger command is present. The latter may be, for example, pulse trains, i.e. an increased frequency or signal level, for which a comparison is performed, trigger command detector 14 being programmed into redundancy unit 11. Trigger command detector 14 is connected via a first data output to pulse generator 15, which functions as a frequency switch-over unit, and/or via a second data output to level switch-over unit 17. Pulse generator 15 is in turn connected via output 16 to driver 12; level switch-over unit 17 is connected via output 18 to driver 12. It is feasible to use pulse generator 15 as well as level switch-over unit 17, or alternatively just one of the two may be used.

Pulse generator 15 sends a pulse train to driver 12 based on the trigger command which has been detected by trigger command detector 14. This pulse train is sent via transmitter 1, or a frequency switch-over is carried out, e.g. a clock pulse is increased by a given factor, if the redundancy signal is to be a transmitted. This constitutes frequency shift keying (FSK). If no trigger command has been detected, pulse generator 15 does not supply any signal. In the case of a trigger command, level switch-over unit 17 switches the output amplitude of driver 12 in the upwards direction by a predefined value, e.g. 3 dB, it not being feasible for this level to arise unless a trigger command is present. Furthermore, it is feasible for the pulse train and/or the level to be sent to driver 12, in order to modulate these redundancy signals or this redundancy signal onto the power transmission.

Processor 8 interprets and converts the trigger command from control device 9 into a trigger signal that can be transmitted via transmitter 1. In addition, processor 8 transfers and receives diagnostic signals and/or control signals via transmitter 1, which if necessary can be sent back to control device 9. The components on primary side 13 and control device 9 may be arranged together in a single housing, so that, advantageously, it is not necessary to use an additional housing.

The signals transmitted via transmitter 1 are received by driver 27 and also by driver 6. Driver 6 receives power and if necessary the redundancy signal via transmitter 1, the redundancy signal being transmitted to the input of enable unit 3. Processor 2 is connected to driver 27 via a data input/output, processor 2 being in the present case a microprocessor. However, an application-specific integrated circuit (ASIC) may be used for this.

A trigger signal that is received by processor 2 via transmitter 1 and driver 27 is used by processor 2 to send a signal to trigger circuit 4 in order to activate trigger circuit 4. However, to accomplish this, trigger circuit 4 must be switched over by enable unit 3 to the appropriate status, so that it can accept this signal from processor 2 as a trigger signal. Therefore enable unit 3 sends an enable signal for trigger circuit 4 if enable unit 3 has detected the redundancy signal. Accordingly, enable unit 3 only sends the enable signal if it has received the redundancy signal. It receives this as a pulse train and/or an increased level from driver 6.

Figure 3:
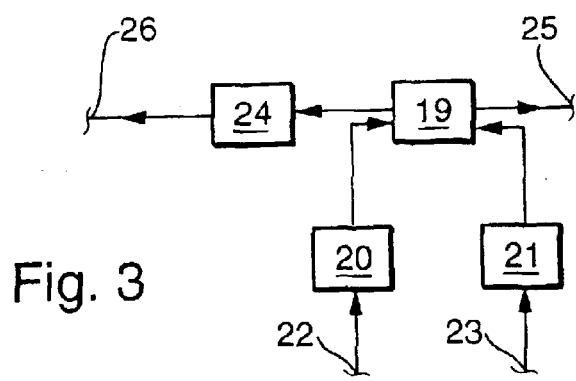
FIG. 3 is a block diagram of the enable unit.

FIG. 3 is a block diagram of enable unit 3. In the present case enable unit 3 is a processor into which the functions described below are programmed. However, enable unit 3 may also be created using discrete components. A signal arrives from driver 6 via input 23 and travels to signal level detector 21. An output of signal level detector 21 connects to decision element 19. Input 22 of enable unit 3 is connected to driver 6, and if necessary receives the pulse train from it as the redundancy signal. This pulse train is then counted by pulse counter 20, and based on this a signal is sent to a second data input of decision element 19. Pulse counter 20 compares the pulses counted in a given time window with a predefined value, and, if this is reached, a trigger signal is sent to decision element 19. Alternatively, just one of the redundancy signals (increased frequency or increased level) may be used, so that either pulse counter 20 or signal level detector 21 is not needed. If both are used, decision element 19 subjects these redundancy signals to an AND operation. Otherwise, based on the trigger signal decision element 19 sends a signal to a monoflop, which is connected to a first data output of decision element 19, so as to cause the monoflop to output a pulse via output 26 of the enable unit, which is connected to trigger circuit 4. Via second data output 25 of enable unit 3, which is connected to a data input of processor 2, processor 2 is switched to an appropriate status so that processor 2 is ready to receive the trigger signal via transmitter 1. Thus decision element 19 fulfills the function of a status circuit for processor 2. To accomplish this, in the present case an interrupt is used.

Alternatively, the pulse train as well as the increased level can be transmitted via driver 6 as the redundancy signal. In this case, in addition the input of the pulse counter is connected to driver 6. According to another option, only the S pulse train is transmitted as the redundancy signal via driver 6 to enable circuit 3.

If trigger circuit 4 has received the enable signal from enable unit 3, and has received the trigger signal from processor 2, trigger circuit 4 triggers restraint system 5, so that restraint system 5 is activated, i.e. either an airbag and/or a seat-belt tensioning device is/are triggered via actuators. Herein, in particular it is possible for ignition of airbags to be carried out subject to time delays.

According to another option involving the method according to the present invention, redundancy may be provided in the normal transmission path. In this case there is no separate signal path for transmitting the redundancy signals. The redundancy signals are superimposed on the signals, diagnostic signals and control signals that are otherwise sent.

Figure 4:
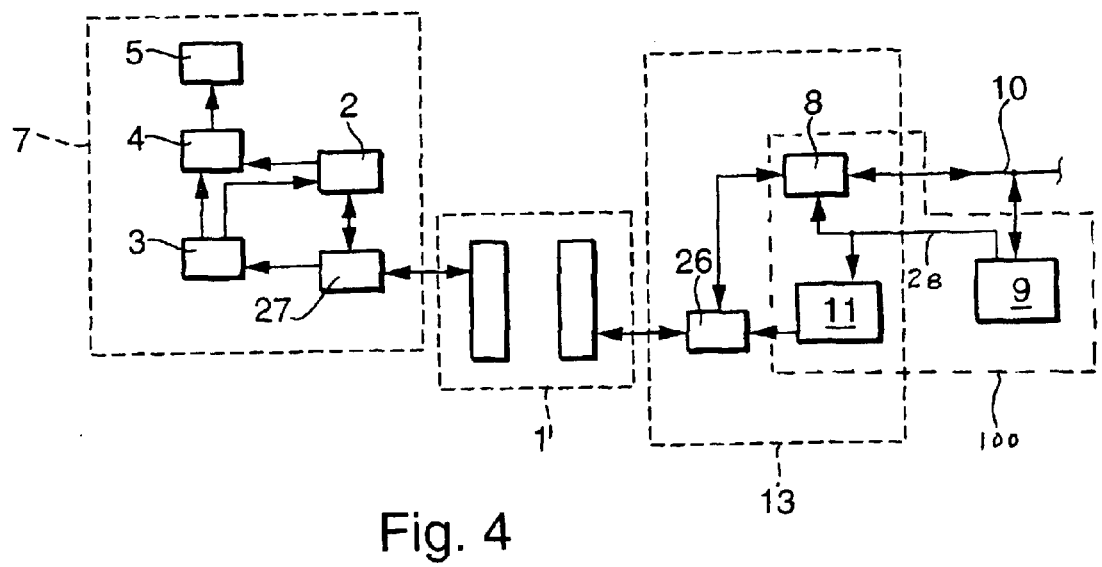
FIG. 4 is a block diagram of a further embodiment of the device according to the present invention.
Figure 5:
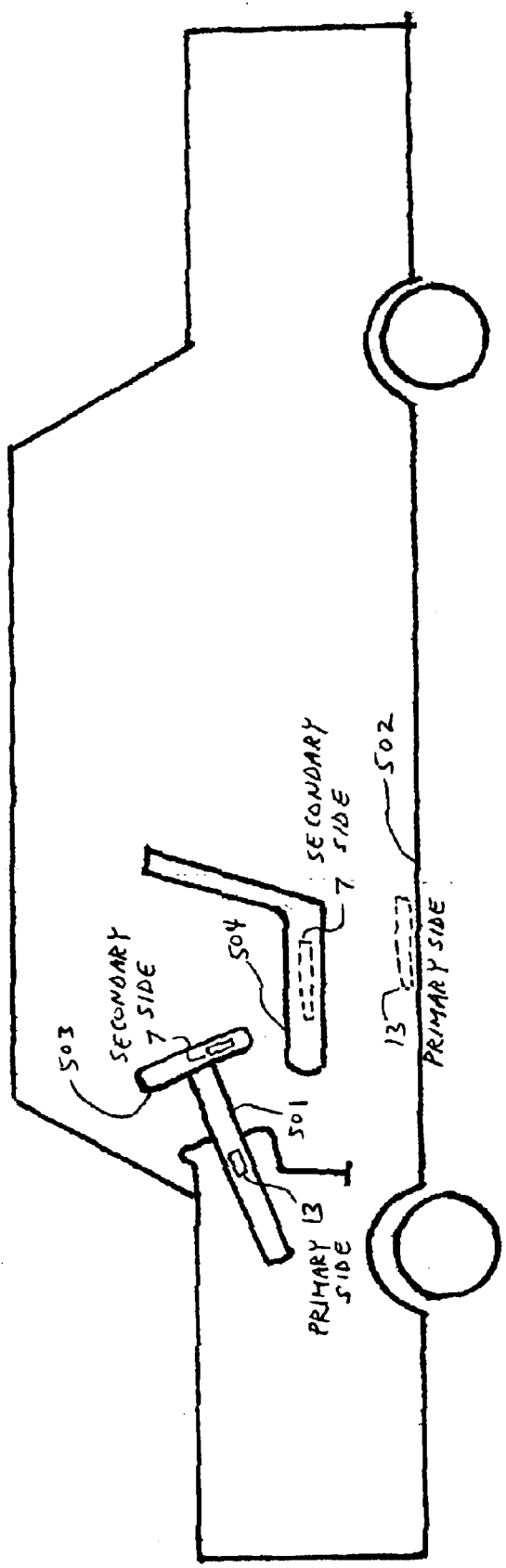
FIG. 5 is a schematic illustration of exemplary positioning of the primary and secondary sides of the device according to the present invention within an automobile.

The device according to the present invention suitable for this is shown in FIG. 4, as a block diagram. Transmitter 1 connects primary side 13 and secondary side 7. The primary side has processor 8, redundancy unit 11 and driver 26; secondary side 7 has driver 27, enable unit 3, trigger circuit 4, restraint system 5 and processor 2.

Control device 9 for restraint system 5 is connected via its data input/output and via CAN bus 10 to processor 8. Moreover, control device 9 is connected via its data output and ignition line 28 to the data input of processor 8 and to the data input of redundancy unit 11. Processor 8 is connected via its second data input/output to driver 26. Redundancy unit 11 is connected via its data output to the data input of driver 26. Driver 26 is connected via its second data input/output to transmitter 1 on the primary side.

On the secondary side, driver 27 is connected via its first data input/output to transmitter 1. Moreover, driver 27 is connected via its second data input/output to processor 2. Furthermore, driver 27 is connected via its data output to enable unit 3. Enable unit 3 is connected via a first data output to processor 2 and via a second data output to trigger circuit 4. Processor 2 is connected via its data output to the second data input of trigger circuit 4. Trigger circuit 4 is connected to restraint system 5.

If a trigger command is sent by control device 9 to processor 8 and redundancy unit 11, redundancy unit 11 superimposes the redundancy signal on the data flow that is sent via driver 26. The superimposing signal may be either a pulse train at an increased frequency and/or an increased level. On the secondary side, enable unit 3 receives from driver 27 the signals sent via transmitter 1. Herein, if an increased level and/or increased frequency is detected, enable unit 3 enables trigger circuit 4 and switches processor 2 to an appropriate status so that it can receive the trigger signal. Thus signal redundancy is achieved without using a second signal path.

What is claimed is:

1. A device for wireless transmission of a trigger signal for a restraint system, comprising:

a transmitter (1), a first evaluation unit (8) and a trigger signal generator (9) being provided on a primary side (13) of the transmitter (1), the trigger signal generator (9) sending a trigger command to the first evaluation unit (8), which converts the trigger command into a trigger signal and sends it via said transmitter (1), and a second evaluation unit (2), which receives the trigger signal and triggers a trigger circuit (4) for the restraint system (5), being arranged on a secondary side (7) of the transmitter (1), wherein on the primary side (13) a redundancy unit (11) is connected to the trigger signal generator (9), the trigger signal generator (9) transmitting the trigger command to the redundancy unit (11), the redundancy unit (11) converting the trigger command into a redundancy signal, and an enable unit (3) which enables the trigger circuit (4) in dependence on the redundancy signal is arranged on the secondary side (7).

2. The device according to claim 1, wherein the enable unit (3) is connected to the second evaluation unit (2), the enable unit (3), when it receives the redundancy signal, switching the second evaluation unit (2) over to a status in which it can receive the trigger signal.

3. The device according to claim 2, wherein the redundancy unit (11) converts the trigger command into at least one of a frequency switch-over and a level switch-over as the redundancy signal.

4. The device according to claim 1, wherein at least one of diagnostic signals and control signals are sent via the first and the second evaluation unit over the transmitter (1).

5. The device according to claim 4, wherein the first evaluation unit (8) interrupts transmission of the at least one of the diagnostic signals and-control signals so as to allow transmission of the trigger signal.

6. The device according to claim 4, wherein the transmitter (1) is one of inductive, capacitive, and optical.

7. The device according to claim 1, wherein the trigger circuit (4) is embodied as at least one ignition circuit for at least one air bag.

8. The device according to claim 1, wherein the trigger circuit (4) is connected to a seat-belt tensioning device.

9. The device according to claim 1, wherein the redundancy unit (11) has at least one of a trigger command detector (14), a pulse generator (15), and a level switch-over unit (17).

10. The device according to claim 1, wherein the enable unit (3) has at least one of a pulse counter (20), a monoflop (24), a status circuit (19) for the second evaluation unit (2) and a signal level detector (21).

11. The device according to claim 1, wherein the primary side (13) is arranged in one of a steering column and a vehicle floor, and the secondary side (7) is arranged in one of a steering wheel and a vehicle seat.

12. The device according to claim 1, wherein the trigger signal generator (9) and at least one of the redundancy unit (11) and the first evaluation unit (8) are arranged in a single housing.

13. The device according to claim 1, wherein the transmitter (1) has at least one winding, and in the case two winding are present, the two windings are at least one of magnetically coupled and decoupled.

* * * * *